United States Patent [19]

Spacht et al.

[11] Patent Number: 5,372,332
[45] Date of Patent: Dec. 13, 1994

[54] SURVIVABILITY ENHANCEMENT AIR VEHICLE

[75] Inventors: Glenn L. Spacht, Lloyd Neck; Richard F. Nastasi, Commack; Walter R. Burhans, Jr., Miller Place, all of N.Y.

[73] Assignee: Grumman Aerospace Corporation, Bethpage, N.Y.

[21] Appl. No.: 109,228

[22] Filed: Aug. 19, 1993

[51] Int. Cl.⁵ .......................... B64C 1/00; B64D 5/00
[52] U.S. Cl. .......................... 244/2; 244/36; 244/118.2
[58] Field of Search .................. 244/2, 158 R, 36, 161, 244/49, 63, 118.2, 131

[56] References Cited

U.S. PATENT DOCUMENTS

| | | | |
|---|---|---|---|
| 3,093,348 | 6/1963 | Schelp et al. | 244/2 |
| 3,614,024 | 10/1971 | Millman | 244/2 |
| 4,159,086 | 6/1979 | Schonfelder | 244/49 |
| 4,802,639 | 2/1989 | Hardy et al. | 244/158 R |
| 5,082,204 | 1/1992 | Croston | 244/36 |

FOREIGN PATENT DOCUMENTS

| | | | |
|---|---|---|---|
| 2306811 | 8/1974 | Germany | 244/2 |
| 3740645 | 6/1989 | Germany | 224/2 |

*Primary Examiner*—Michael S. Huppert
*Assistant Examiner*—Virna Lissi Ansley
*Attorney, Agent, or Firm*—Collard & Roe

[57] ABSTRACT

A survivability enhancement air vehicle adapted to be air launched from a launching aircraft has a fuselage with a top half and a bottom half separable from the top half. A first stage rocket constitutes the bottom half of the fuselage and a second stage rocket and associated avionics constitute the top half of the fuselage. Gull wings are rotatably mounted on the top half of the fuselage for rotation from a stowed position next adjacent the top half to an extended position substantially 90 degrees toward the bottom half upon being air launched. A separation device in the fuselage separates and drops the bottom half of the fuselage from the top half upon burnout of the first stage rocket. A control system in the top half of the fuselage controls the air vehicle in flight either from the launching aircraft or autonomously, whereby the air vehicle may be used to protect the launching aircraft in a hostile environment.

8 Claims, 2 Drawing Sheets

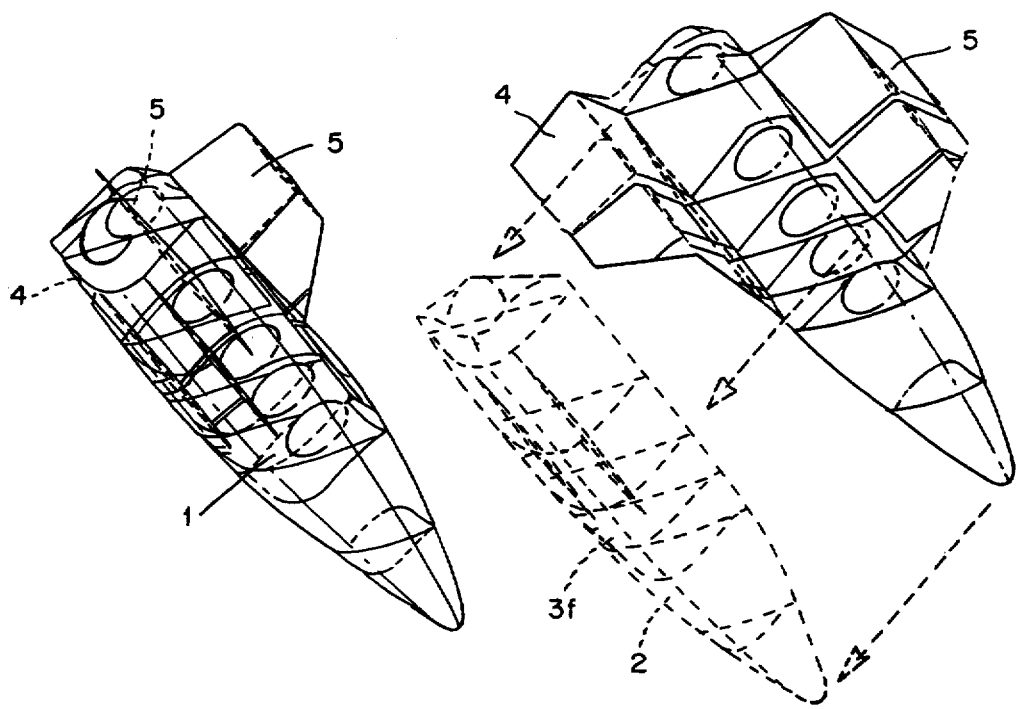
FIG. 1
FIG. 3
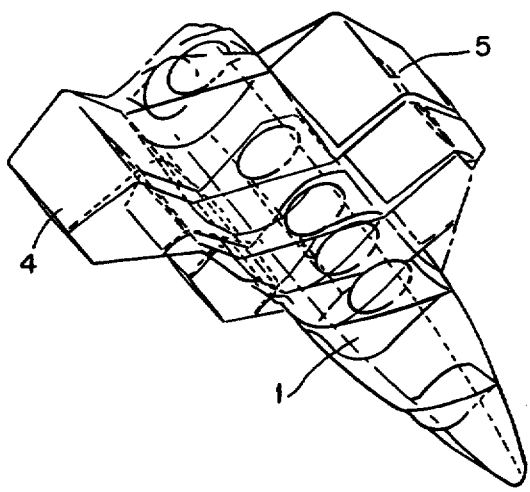
FIG. 2
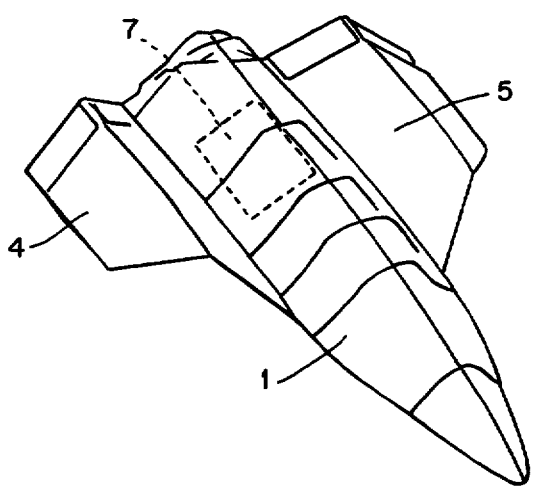
FIG. 4

SURVIVABILITY ENHANCEMENT AIR VEHICLE

BACKGROUND OF THE INVENTION

FIELD OF THE INVENTION

The present invention relates to an air launched air vehicle. More particularly, the invention relates to a survivability enhancement air vehicle adapted to be air launched from a primary aircraft.

Technology has now been developed which permits air vehicles to be controlled at angles of attack which have heretofore been considered to be "outside the envelope". This expansion of the flight envelope will permit manned fighter aircraft which utilize this technology unprecedented maneuverability. The tactical advantages of this maneuverability enhancement have been demonstrated in manned vehicles.

The principal object of the invention is to provide an air vehicle which fully exploits the aforedescribed technology and which has the aforedescribed novel characteristics.

An object of the invention is to provide an air launched air vehicle which functions efficiently, effectively and reliably as a survivability enhancement vehicle.

Another object of the invention is to provide an air launched survivability enhancement vehicle of simple structure which functions effectively and reliably as an unmanned semi-autonomous wing craft for a manned aircraft.

Still another object of the invention is to provide an air launched air vehicle which would be unmanned and would be either controllable by the launching aircraft or autonomous to enhance the chances of survival of said aircraft.

BRIEF SUMMARY OF THE INVENTION

In accordance with the invention, an air vehicle adapted to be air launched comprises a fuselage having a top half and a bottom half separable from the top half. A first stage rocket constitutes the top half of the fuselage. A second stage rocket and associated avionics constitute the top half of the fuselage. Gull wings are rotatably mounted on the top half of the fuselage for rotation from a stowed position to an extended position upon being air launched. A separation device in the fuselage separates and drops the top half of the fuselage from the bottom half upon burnout of the first stage rocket. A control in the top half of the fuselage controls the air vehicle in flight either from a remote location or autonomously.

The top and bottom halves of the fuselage are substantially equal in configuration and volume. Each of the top and bottom halves of the fuselage is substantially trapezoidal in cross section. Each of the top and bottom halves of the fuselage is substantially trapezoidal in cross section with a long side of each being common to both halves, a spaced opposite short side of each being the top of the top half and the bottom of the bottom half and sides sloping downward from each of the short sides to the long side. The first stage rocket constitutes the bottom half of the fuselage.

In accordance with the invention, a survivability enhancement air vehicle adapted to be air launched from a launching aircraft comprises a fuselage having a top half and a bottom half separable from the top half. A first stage rocket constitutes the bottom half of the fuselage. A second stage rocket and associated avionics constitute the top half of the fuselage. Gull wings are rotatably mounted on the top half of the fuselage for rotation from a stowed position next adjacent the top half to an extended position substantially 90 degrees toward the bottom half upon being air launched. A separation device in the fuselage separates and drops the top half of the fuselage from the bottom half upon burnout of the first stage rocket. A control in the top half of the fuselage controls the air vehicle in flight either from the launching aircraft or autonomously, whereby the air vehicle may be used to protect the launching aircraft in a hostile environment.

Both of the top and bottom halves of the fuselage are substantially trapezoidal in cross section with a long side of each half being common to both and a spaced opposite short side of one being the top of the top half and the spaced opposite short side of the other being the bottom of the bottom half.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a perspective view of an embodiment, in cutaway mode, of the survivability enhancement air vehicle of the invention as it is launched from the launching aircraft;

FIG. 2 is a perspective view, in cutaway mode, of the vehicle of FIG. 1 shortly before separation and dropping of the bottom half thereof as the wings are being developed;

FIG. 3 is a perspective exploded view, in cutaway mode, of the vehicle of FIG. 1 upon separation and dropping of the bottom half thereof;

FIG 4 is a perspective view of the top half of the vehicle of FIG. 1;

DETAILED DESCRIPTION OF PREFERRED EMBODIMENT

Figure 5:
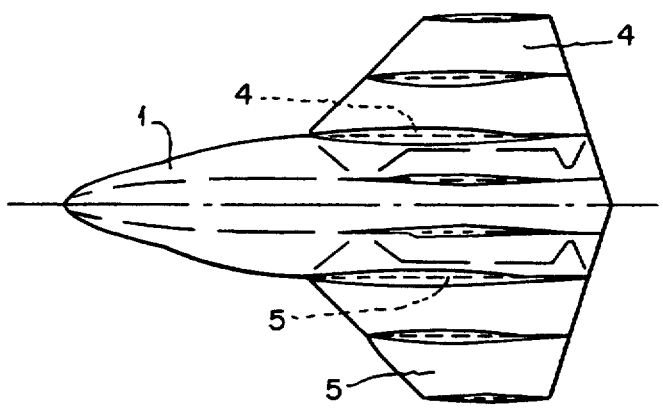
FIG. 5 is a top plan view, on a reduced scale, of the air vehicle of FIG. 1, both wing positions being shown.

The survivability enhancement air vehicle of the invention is shown in FIGS. 1 to 8 and is adapted to be launched from a launching aircraft. The survivability enhancement air vehicle has a fuselage having a top half 1 (FIGS. 1 to 8) and a bottom half 2 (FIGS. 3, 6 and 7) separable from said top half.

A second stage rocket $3s$ of any suitable known type and associated avionics of any suitable known type constitute the top half 1 of the fuselage. A first stage rocket $3f$ of any suitable known type constitutes the bottom half 2 of the fuselage.

Gull wings 4 and 5 are rotatably mounted on the top half 1 of the fuselage for rotation from a stowed position next adjacent said top half, as shown in broken lines in FIGS. 1 and 5 to 8, to an extended position substantially 90 degrees toward the bottom half 2 upon being air launched, as shown by solid lines in FIGS. 2 to 8.

A separation device 6 of any suitable known type is housed in the fuselage (FIGS. 6 and 7) and functions in the usual manner to separate and drop the top half 1 of the fuselage from the bottom half 2 upon burnout of the first stage rocket 3.

A control system 7 of any suitable known type is housed in the top half 1 of the fuselage (FIG. 4) and functions to control the air vehicle in flight either from the launching aircraft or autonomously in the usual manner of remote control of aircraft. This enables the launching aircraft to use the air vehicle to protect said launching aircraft in a hostile environment.

Figure 6:
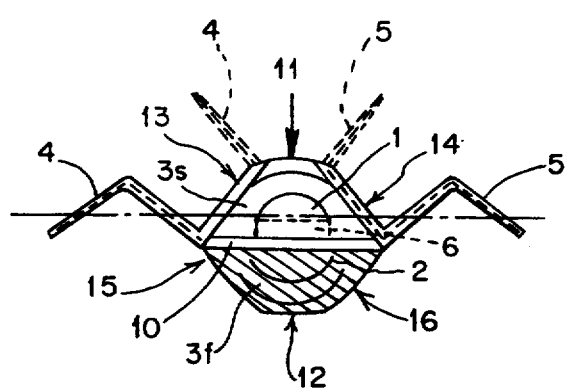
FIG. 6 is a front view, on a reduced scale, of the air vehicle of FIG. 2, both wing positions being shown.
Figure 7:
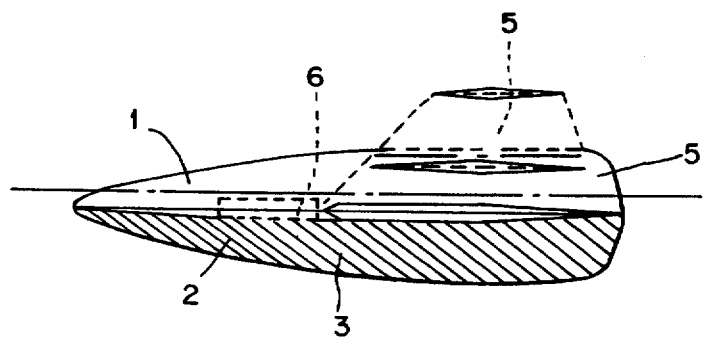
FIG. 7 is a side view, on a reduced scale, of the air vehicle of FIG. 1, both wing positions being shown.
Figure 8:
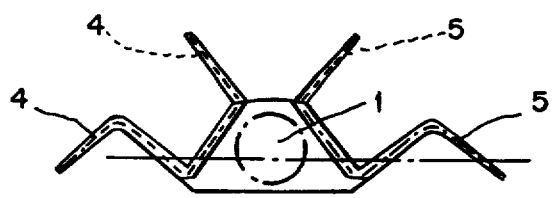
FIG. 8 is a front view, on a reduced scale, of the air vehicle of FIG. 4, both wing positions being shown.

In the illustrated embodiment, the top and bottom halves 1 and 2, respectively, of the fuselage are trapezoidal in cross section. Thus, as shown in FIG. 6, a long side 10 of each of the halves 1 and 2 is common to both. A spaced opposite substantially parallel short side 11 of one half is the top of the top half 1 and the spaced opposite substantially parallel short side 12 of the other half is the bottom of the bottom half 2 (FIG. 6). Sides 13 and 14 slope downward from the short side 11 to the long side 10 and sides 15 and 16 slope downward from the short side 12 to the long side 10, as shown in FIG. 6.

While only a single embodiment of the present invention has been shown and described, it is to be understood that many changes and modifications may be made thereunto without departing from the spirit and scope of the invention as defined in the appended claims.

What is claimed is:

1. An air vehicle adapted to be air launched, said air vehicle comprising:
   a fuselage having a top half and a bottom half separable from said top half;
   a second stage rocket and associated avionics constituting the top half of said fuselage;
   a first stage rocket constituting the bottom half of said fuselage;
   gull wings rotatably mounted on said top half of said fuselage for rotation from a stowed position to an extended position upon being air launched;
   separation means in said fuselage for separating and dropping said top half of said fuselage from said bottom half upon burnout of said first stage rocket; and
   control means in said top half of said fuselage for controlling said air vehicle in flight from a remote location.

2. An air vehicle as claimed in claim 1, wherein said top and bottom halves of said fuselage are substantially equal in configuration and volume.

3. An air vehicle as claimed in claim 2, wherein each of said top and bottom halves of said fuselage is substantially trapezoidal in cross section.

4. An air vehicle as claimed in claim 2 wherein each of said top and bottom halves of said fuselage is substantially trapezoidal in cross section with a long side of each being common to both said halves, a spaced opposite short side of each being the top of said top half and the bottom of said bottom half and sides sloping downward from each of said short sides to said long side.

5. A survivability enhancement air vehicle adapted to be air launched from a launching aircraft, said air vehicle comprising:
   a fuselage having a top half and a bottom half separable from said top half;
   a second stage rocket and associated avionics constituting the top half of said fuselage;
   a first stage rocket constituting the bottom half of said fuselage;
   gull wings rotatably mounted on said top half of said fuselage for rotation from a stowed position next adjacent said top half to an extended position substantially 90 degrees toward said bottom half upon being air launched;
   separation means in said fuselage for separating and dropping said bottom half of said fuselage from said top half upon burnout of said first stage rocket; and
   control means in said top half of said fuselage for controlling said air vehicle in flight from said launching aircraft, whereby said air vehicle may be used to protect said launching aircraft in a hostile environment.

6. A survivability enhancement air vehicle as claimed in claim 5, wherein both of said top and bottom halves of said fuselage are substantially trapezoidal in cross section with a long side of each half being common to both and a spaced opposite short side of one being the top of said top half and the spaced opposite short side of the other being the bottom of said bottom half.

7. An air vehicle as claimed in claim 1, wherein said control means controls said air vehicle autonomously.

8. A survivability enhancement air vehicle as claimed in claim 5, wherein said control means controls said air vehicle autonomously.

* * * * *